(12) United States Patent
Partheepan (10) Patent No.: US 12,092,021 B2
(45) Date of Patent: Sep. 17, 2024

(54) HYDROGEN HYBRID CYCLE SYSTEM

(71) Applicant: Tascosa Advanced Services, Inc., San Antonio, TX (US)

(72) Inventor: Joshua Partheepan, Canyon, TX (US)

( * ) Notice: Subject to any disclaimer, the term of this patent is extended or adjusted under 35 U.S.C. 154(b) by 0 days.

(21) Appl. No.: 18/051,506

(22) Filed: Oct. 31, 2022

(65) Prior Publication Data
US 2023/0258123 A1   Aug. 17, 2023

Related U.S. Application Data

(63) Continuation of application No. 16/787,008, filed on Feb. 10, 2020, now abandoned.

(51) Int. Cl.
*F02C 3/22* (2006.01)
*F02C 1/00* (2006.01)
*F02C 3/24* (2006.01)

(52) U.S. Cl.
CPC .............. *F02C 3/22* (2013.01); *F02C 1/00* (2013.01); *F02C 3/24* (2013.01)

(58) Field of Classification Search
CPC ...... F02C 3/20; F02C 3/22; F02C 3/24; F02C 3/30; F02C 1/00
See application file for complete search history.

(56) References Cited

U.S. PATENT DOCUMENTS

| | | |
|---|---|---|
| 3,459,953 A | 8/1969 | Hughes |
| 4,074,708 A | 2/1978 | Hochmuth |
| 4,148,185 A | 4/1979 | Somers |
| 4,474,140 A | 10/1984 | Sternfeld |
| 5,050,375 A * | 9/1991 | Dickinson ............... F01K 3/188 110/238 |
| 5,331,806 A | 7/1994 | Warkentin |
| 5,644,911 A | 7/1997 | Huber |
| 5,687,559 A | 11/1997 | Sato |
| 5,775,091 A | 7/1998 | Bannister et al. |
| 5,782,081 A | 7/1998 | Pak et al. |
| 5,809,768 A | 9/1998 | Uematsu et al. |
| 6,021,569 A | 2/2000 | Bannister et al. |
| 6,263,568 B1 | 7/2001 | Bannister et al. |
| 6,282,883 B1 | 9/2001 | Uematsu et al. |
| 7,546,732 B2 | 6/2009 | Glasgow et al. |
| 7,827,794 B1 * | 11/2010 | Pronske .................... F02C 3/22 60/728 |
| 8,169,101 B2 | 5/2012 | Hinders et al. |
| 2005/0072381 A1 | 4/2005 | Requadt |
| 2005/0223711 A1 | 10/2005 | Goldmeer et al. |

(Continued)

*Primary Examiner* — Steven M Sutherland
(74) *Attorney, Agent, or Firm* — Shannon Warren (57) ABSTRACT

A hydrogen hybrid cycle system configured to convert heat into mechanical work by burning a H2 and an O2. The hydrogen hybrid cycle system comprises a H2 source, an O2 source, a combustion chamber, a first steam injected gas turbine, a load, a heat recovery steam generator and a water pump. The H2 source provides the H2 to the combustion chamber. The O2 source provides the O2 to the combustion chamber. The combustion chamber burns portions of the H2 and the O2. The hydrogen hybrid cycle system burns the H2 and the O2 at or near stoichiometry in the combustion chamber. The hydrogen hybrid cycle system cools the combustion chamber with at least one of a cooling steam and a water.

19 Claims, 5 Drawing Sheets

(56) References Cited

U.S. PATENT DOCUMENTS

| | | | |
|---|---|---|---|
| 2006/0185347 A1* | 8/2006 | Knapp | F01C 13/04 |
| | | | 60/269 |
| 2008/0083537 A1 | 4/2008 | Klassen et al. | |
| 2010/0314878 A1 | 12/2010 | DeWitt | |
| 2011/0126549 A1* | 6/2011 | Pronske | F02C 7/143 |
| | | | 60/39.12 |

* cited by examiner

HYDROGEN HYBRID CYCLE SYSTEM

CROSS-REFERENCE TO RELATED APPLICATIONS

This application claims benefit to U.S. patent application Ser. No. 14/763,467 filed on 2015 Jul. 24, 62/540,348 filed on 2017 Aug. 2, 62/542,786 filed on Aug. 8 2017, PCT/US18/45881 filed 2018 Aug. 8 and 16787008 filed 2020 Feb. 10. All parent applications are hereby incorporated by reference.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

The present invention is a system for burning hydrogen ($H_2$) and oxygen ($O_2$) to provide power or propulsion. It can comprise a system that operates in a closed loop by combustion hydrogen at stoichiometry or near stoichiometry to produce steam. Steam drives a turbine to convert the heat energy into mechanical energy which can be used for useful work. In specific configurations, the invention allows for operation at various pressures, temperatures and load efficiently, making the system a flexible, economical, and pollution-free power generation source for electric utilities and large-scale locomotives.

Hydrogen has been known for its combustible nature since 1650, when it was described as "inflammable air." Hydrogen as a fuel has unique properties and is significantly different from all other commonly used hydrocarbon liquid and gas fuels; it is extremely flammable, and often described as the most flammable of all known substances.

Hydrogen is not often used in a combustion process for energy conversion, but rather used in fuel cells to produce electrical energy. Hydrogen fuel cells are efficient, but expensive, and sensitive to load fluctuations, operational environment, and fuel impurities. Hydrogen combustion for power generation can be an alternative to fuel cells, but the key challenges with hydrogen combustion for energy conversion are to ensure operational safety of the process and to reduce its complexity and cost.

Combustion of said $H_2$ and said $O_2$ at stoichiometry produces a high-temperature flame which results in steam and unburnt gasses. This unique property of hydrogen oxygen combustion can be used to generate steam by mixing the hot combustion resultant with said water or steam to regulate the resultant steam temperature as desired.

A device which burns $H_2$ and/or $O_2$ at stoichiometry for steam generation, described as an "aphodid burner," was patented in 1967 by Oklahoma State University. Several papers were written about it in the early 1970s. The German Aerospace Center (DLR) and the Institute of Combustion Aerothermics Reactivity and Environment (ICARE) in France collaborated to study several configurations of hydrogen-oxygen combustion-based steam generators for power generation. These used several different configurations of said water injection into the steam generators. The DLR and ICARE have also collaborated to design and patent a steam generator for sterilization purposes in the pharmaceutical industry.

Several thermodynamic cycle models were proposed after the invention of hydrogen-oxygen combustion-based steam generators. Models of H2 and/or O2 combustion for power generation are disclosed in U.S. Pat. Nos. 3,459,953, 4,148,185, 5,331,806, 5,644,911, 5,687,559, 5,775,091, 5,782,081, 5,809,768, 6,021,569, 6,263,568 B1, 6,282,883 B1, 7,546,732 B2, 8,169,101 B2, 20050223711 A1, 20043435 A1, 20314878 A1, 20175638 A1. However, the current patent application presents a different and unique design.

Further, these references are cited in the examination of the parent application: Uematsu U.S. Pat. No. 5,809,768 in view of Huber U.S. Pat. No. 5,644,911; Knapp 2006/0185347; Pronske 2011/0126549; and Sato U.S. Pat. No. 5,687,559.

Uematsu, '768, describes a hydrogen hybrid cycle system configured to convert heat into mechanical work by burning a H2 and an O2. The hydrogen hybrid cycle system comprises a H2 source, an O2 source, a combustion chamber, a first steam injected gas turbine, a load, a heat recovery steam generator and a water pump. Sato, '559, describes about a hydrogen-oxygen combustion turbine plant having an improved thermal efficiency and capable of being designed in a flexible manner. The plant consist of a compressor, a water injection device, a condenser, a gas turbine, a Second turbine, a third turbine and the combustion chamber.

Comparing these references highlights the advancements of the current system. Uematsu does not use a steam compressor whereas Sato uses a steam compressor. Uematsu uses a gas turbine assembly which might have multiple stage and multiple axis, whereas Sato uses a gas turbine which might have multiple stage and multiple axis and additionally uses two more gas turbine. Likewise, Uematsu uses one heat recovery steam generator, which can extract the heat from the gas turbine exhaust and generate cooling steam, whereas Sato refers to multiple heat exchanger catering to different turbine assembly.

Unlike Uematsu and Sato, the current system does not compress fluids between points. Uematsu uses a compressor instead of using steam in the turbine set. Steam compressors are not thermodynamically efficient. As is known in the art, gas systems require air to be compressed. The current system, however, eliminates a compressor and sees up to a 100% jump in efficiency. The claims of this continuation call on this distinction to differentiate itself from the prior art.

For reasons outlined below, these references are not seen whether taken singularly or in combination, to describe the instant disclosure as claimed.

BRIEF SUMMARY OF THE INVENTION

A hydrogen hybrid cycle system configured to convert heat into mechanical work by burning a H2 and an O2. Said hydrogen hybrid cycle system comprises a H2 source, an O2 source, a combustion chamber, a first steam injected gas turbine, a load, a heat recovery steam generator and a water pump. Said H2 source provides said H2 to said combustion chamber. Said O2 source provides said O2 to said combustion chamber. Said combustion chamber burns portions of said H2 and said O2. Said hydrogen hybrid cycle system burns said H2 and said O2 at or near stoichiometry in said combustion chamber. Said hydrogen hybrid cycle system cools said combustion chamber with at least one of a cooling steam and a water. Said combustion chamber creates a generated steam. Said generated steam turns said first steam injected gas turbine. Said first steam injected gas turbine is coupled said load.

A power generation method for producing useful work through said hydrogen hybrid cycle system includes following stages, or components: a combustion step, a steam generation step, a driving turbine step, a generating power step, a generating cooling steam step and a cooling stream for combustion step. Said combustion step comprises receiving said H2 in said combustion chamber, receiving said O2 in said combustion chamber, and burning portions of said H2 and said O2 in said combustion chamber. Said steam generation step comprises cooling said combustion chamber with said cooling steam and said water, and generating said generated steam. Said driving turbine step comprises driving said first steam injected gas turbine with said generated steam. Said generating power step comprises generating said cooling steam with said heat recovery steam generator, and delivering said cooling steam from said heat recovery steam generator to said combustion chamber through one or more cooling steam passages. Said generating cooling steam step comprises cooling said combustion chamber with said cooling steam. Said hydrogen hybrid cycle system comprises said H2 source, said O2 source, said combustion chamber, said first steam injected gas turbine, said heat recovery steam generator, said water pump, and said load. Said H2 source provides said H2 to said combustion chamber. Said O2 source provides said O2 to said combustion chamber. Said combustion chamber burns portions of said H2 and said O2. Said hydrogen hybrid cycle system burns said H2 and said O2 at or near stoichiometry in said combustion chamber. Said hydrogen hybrid cycle system cools said combustion chamber with said cooling steam and said water. Said combustion chamber creates said generated steam. Said first steam injected gas turbine is coupled with said load. Said combustion chamber receives said H2 from said H2 source through a H2 passage, said O2 from said O2 source through an O2 passage, said water from a water reservoir through a water reservoir passage, and said cooling steam from said heat recovery steam generator through a steam passage.

DETAILED DESCRIPTION OF THE INVENTION

Figure 1:
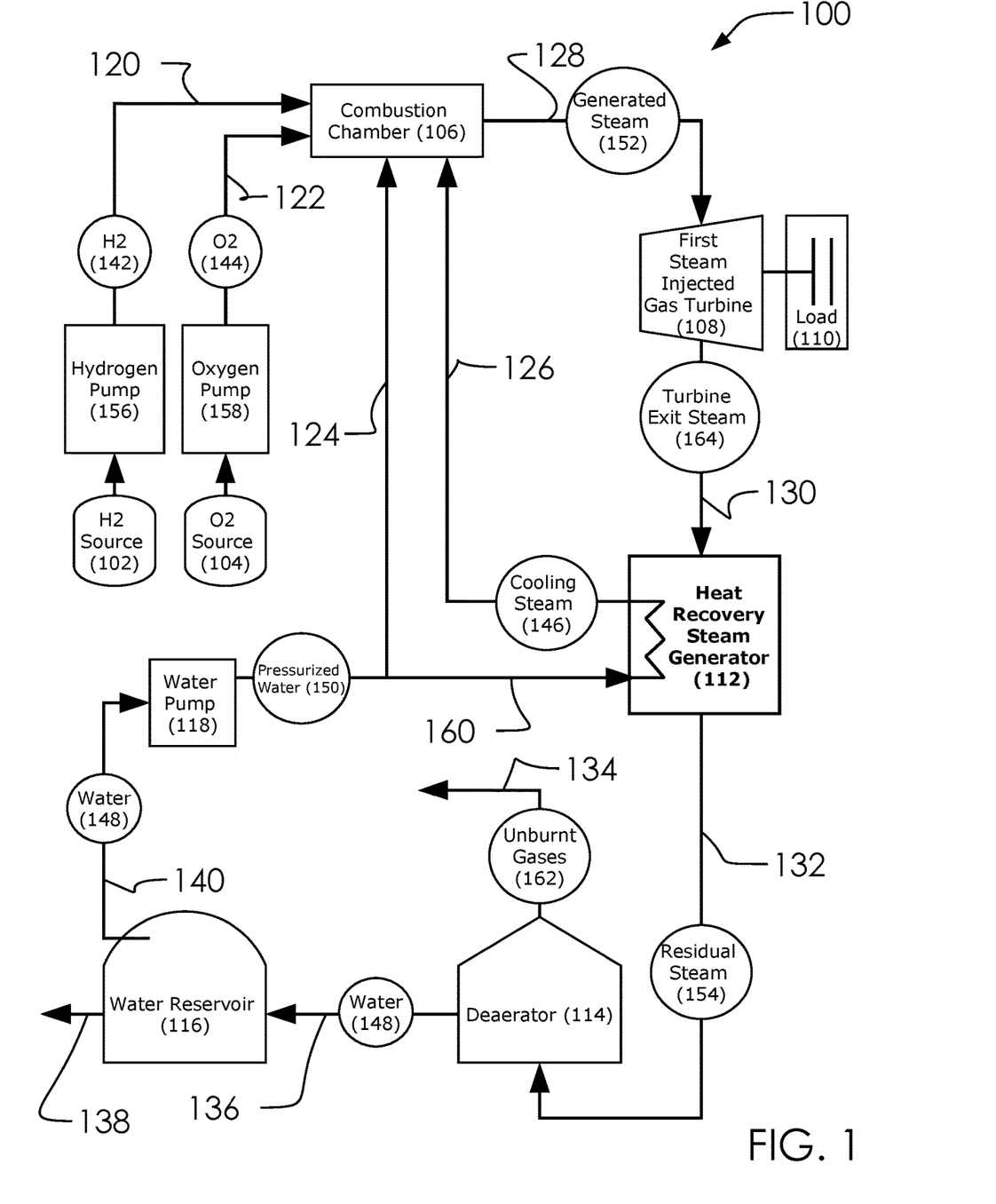
FIG. 1 illustrates block diagram view of a hydrogen hybrid cycle system 100.

FIG. 1 illustrates block diagram view of a hydrogen hybrid cycle system 100.
In one embodiment, said hydrogen hybrid cycle system 100 can comprise a H2 source 102, an O2 source 104, a combustion chamber 106, a first steam injected gas turbine 108, a load 110, a heat recovery steam generator 112, a deaerator 114, a water reservoir 116, a water pump 118, a steam passage 126, a generated steam passage 128, a turbine exit steam passage 130, a residual steam passage 132, an unburnt gas vent passage 134, a water reservoir passage 136, a bleed water passage 138, a second water passage 140, a H2 142, an O2 144, a cooling steam 146, a water 148, a pressurized water 150, a generated steam 152, a residual steam 154, a hydrogen pump 156, an oxygen pump 158, a water to heat recovery steam generator passage 160, an unburnt gas 162 and a turbine exit steam 164.

In one embodiment, said cooling steam 146 can comprise a low temp cooling steam 146a, a medium temp cooling steam 146b and a high temp cooling steam 146c.

Note that the simplified block diagram represents a minimalistic version of said hydrogen hybrid cycle system 100. Many of the elements illustrated in FIG. 1 are described and illustrated in more detail below.

In one embodiment, said hydrogen hybrid cycle system 100 can comprise said H2 source 102, said O2 source 104, said combustion chamber 106, said first steam injected gas turbine 108, said heat recovery steam generator 112, said deaerator 114, said water reservoir 116 and said water pump 118.

In one embodiment, said H2 source 102 can be hydrogen in gaseous phase stored under pressure in gas cylinders, or containers. Said H2 source 102 can comprise hydrogen stored in large scale in geological storage. Said H2 source 102 can comprise hydrogen stored in indirect form, i.e., metal hydrides. Said H2 source 102 can comprise hydrogen from industrial processes. Said H2 source 102 can comprise hydrogen stored in liquid phase.

In one embodiment, said H2 source 102 can comprise a hydrogen comprising an impurity ratio. Said impurity ratio comprises an industrial standard of ninety-nine-point nine percent pure hydrogen; wherein, said hydrogen hybrid cycle system can be configured to accommodate said impurity ratio being below said industrial standard depending on a final temperature, a pressure, a quality and a usage of a generated steam by a combustion chamber. In another embodiment, said hydrogen hybrid cycle system 100 can accommodate some impurities in said H2 source 102, depending on the final temperature and pressure of said generated steam 152 and the tolerance of said first steam injected gas turbine 108 towards impurities.

In one embodiment, said H2 source 102 can supply said H2 142 under pressure to said combustion chamber 106. Where said H2 source 102 comprises a low-pressure, said hydrogen pump 156 can be used to attain necessary pressure of said H2 142 for operation before entering said combustion chamber 106.

Said H2 source 102 is fed into said combustion chamber 106 through a H2 passage 120.

In one embodiment, said O2 source 104 can be said O2 144 in gaseous phase stored under pressure in gas cylinders, or containers. Said O2 source 104 can comprise oxygen stored in large scale in geological storage. Said O2 source 104 can comprise oxygen from industrial processes. Said O2 source 104 can comprise oxygen stored in liquid phase. Said O2 source 104 can comprise an oxygen purity which can comprise an industrial grade. In one embodiment, said hydrogen hybrid cycle system 100 can accommodate some impurities depending on the final temperature and pressure of said generated steam 152 and the tolerance of said first steam injected gas turbine 108 towards impurities.

In one embodiment, said O2 source 104 will supply said O2 144 under pressure to said combustion chamber 106. If said O2 source 104 comprises low-pressure oxygen, said oxygen pump 158 can be used to attain the necessary pressure of oxygen for operation before entering said combustion chamber 106.

In one embodiment, said O2 144 can be fed into said combustion chamber 106 through an O2 passage 122.

In one embodiment, said water reservoir 116 contains said water 148 being demineralized with additives in accordance with industrial standards or requirements for said first steam injected gas turbine 108 and/or said heat recovery steam generator 112.

In one embodiment, said water 148 is pumped into said combustion chamber 106 through said second water passage 140 and a first water passage 124, as illustrated.

In one embodiment, said heat recovery steam generator 112 creates said cooling steam 146. In one embodiment, said cooling steam 146 is delivered to said combustion chamber 106 through said steam passage 126.

In one embodiment, said combustion chamber 106 receives said H2 142, said O2 144, said cooling steam 146, said pressurized water 150 and said generated steam 152.

In one embodiment, said combustion chamber 106 is configured to: (1) burn said H2 142 and said O2 144 at or near stoichiometry, (2) include said cooling steam 146 and said pressurized water 150 and/or a mixture of both as a coolant. In one embodiment, inclusion of said pressurized water 150 and/or said cooling steam 146 can be selected depending on a configuration of said combustion chamber 106 and availability of said pressurized water 150 or said cooling steam 146.

The temperature of said generated steam 152, created by said combustion chamber 106, depends on a flow and temperature of said pressurized water 150 and said cooling steam 146 entering said combustion chamber 106.

Said combustion chamber 106 can utilize any suitable type of combustion strategy, depending on the application and operational circumstances.

In one embodiment, said first steam injected gas turbine 108 receives said generated steam 152 through said generated steam passage 128.

In one embodiment, said generated steam 152 can selectively turn one or more turbines in said first steam injected gas turbine 108, and consequently produces useful outputs, such as electricity, as is known in the art.

In one embodiment, said turbine exit steam 164 reaches said heat recovery steam generator 112 through said turbine exit steam passage 130.

In one embodiment, said turbine exit steam 164 can be low in pressure, but high in temperature; wherein, energy which is found in said turbine exit steam 164 can be harnessed in said heat recovery steam generator 112 and used to convert said pressurized water 150 into said cooling steam 146. In one embodiment, said cooling steam 146 can be high-pressure. In one embodiment, said cooling steam 146 and said residual steam 154 do not commingle with each other.

In one embodiment, said residual steam 154 can comprise condensate from said heat recovery steam generator 112. Said condensate can reach said deaerator 114 through said residual steam passage 132. Said unburnt gas 162 are separated in said deaerator 114 and safely released into the atmosphere through said unburnt gas vent passage 134. Said water 148 can then be collected and stored in said water reservoir 116.

In one embodiment, said water 148 from said deaerator 114 can reach said water reservoir 116 through said water reservoir passage 136.

In one embodiment, said water reservoir 116 can be configured to store said water 148 for reuse in said hydrogen hybrid cycle system 100. Depending on the needs of an installation of said hydrogen hybrid cycle system 100, portions of said water 148 can exit said water reservoir 116 through said bleed water passage 138 and be used for additional purposes, including drinking, agriculture, or industrial processes.

In one embodiment, said water pump 118 can pump said water 148 from said water reservoir 116. Said pressurized water 150 can be divided and then fed into said heat recovery steam generator 112 and said combustion chamber 106 through said water to heat recovery steam generator passage 160 and said first water passage 124, respectively.

In one embodiment, pressure loss (in said combustion chamber 106, said first steam injected gas turbine 108 and said heat recovery steam generator 112), along with the maximum working pressure of steam in said hydrogen hybrid cycle system 100 can be used to determine a pressure of said pressurized water 150 to be delivered from said water pump 118.

In one embodiment, pressure loss in said heat recovery steam generator 112, said first water passage 124, said steam passage 126 and said water to heat recovery steam generator passage 160, along with the maximum working pressure of steam in said hydrogen hybrid cycle system 100 can be used to determine a pressure of said pressurized water 150 to be delivered from said water pump 118.

In one embodiment, said water 148 that enters said heat recovery steam generator 112 can be converted into said cooling steam 146 (which can comprise high-pressure) by transferring heat from said turbine exit steam 164 (which can comprise low-pressure, high temperature). In one embodiment, said cooling steam 146 from said heat recovery steam generator 112 can be fed into said combustion chamber 106 through said steam passage 126.

Figure 2:
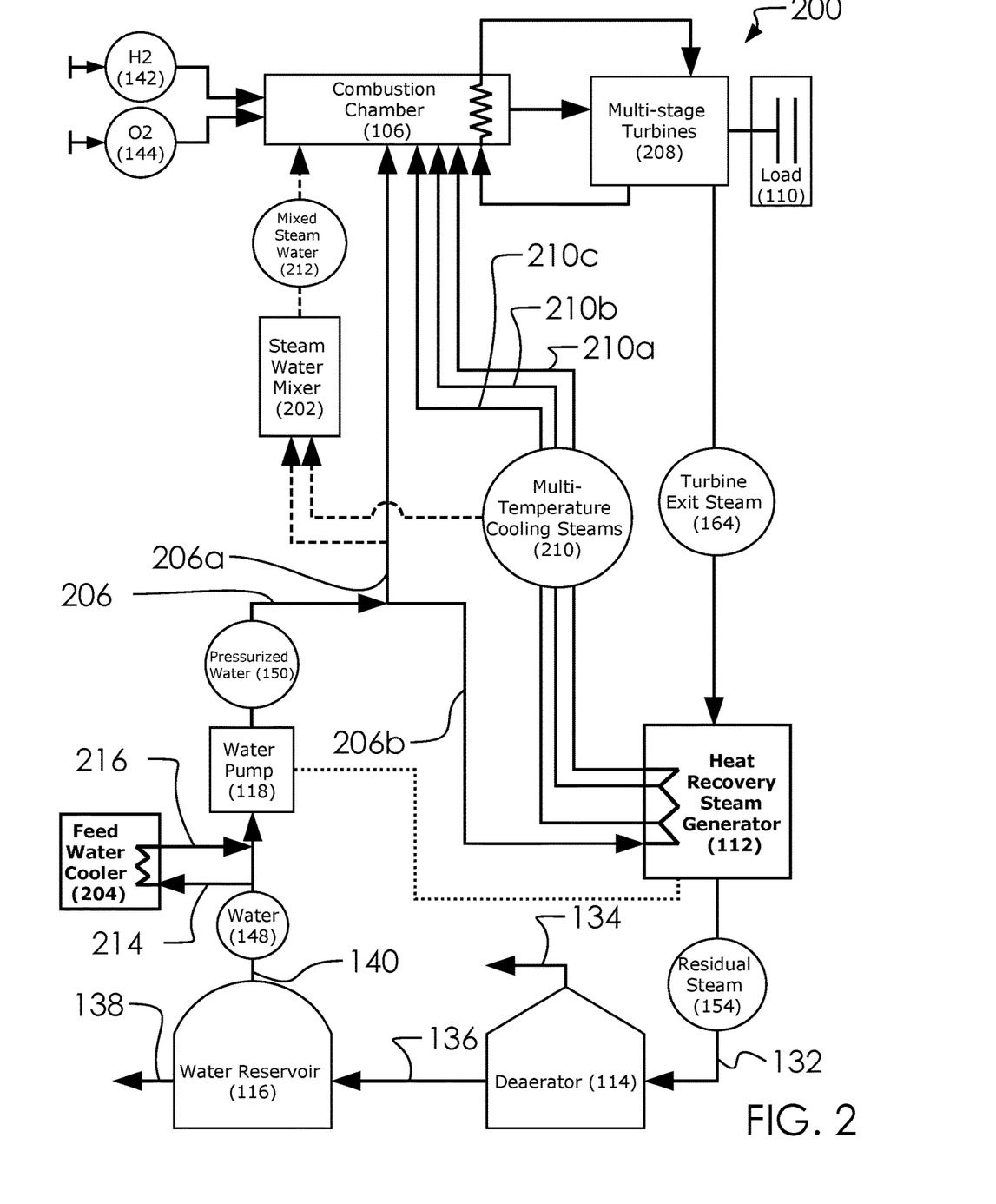
FIG. 2 illustrates block diagram view of a hydrogen hybrid cycle system 100.

FIG. 2 illustrates block diagram view of said hydrogen hybrid cycle system 100.

In one embodiment, a pressurized water streams 206 can comprise a first pressurized water stream 206a and a second pressurized water stream 206b.

In one embodiment, a feed water cooler 204 can comprise feed said water 148 to a feed water to feed water cooler input passage 214 and a feed water to feed water cooler output passage 216.

In one embodiment, a multi-temperature cooling steams 210 can comprise a first temperature cooling steam 210a, a second temperature cooling steam 210b and a third temperature cooling steam 210c.

In one embodiment, said hydrogen hybrid cycle system 100 can comprise said feed water cooler 204 and a multi-stage turbines 208.

In one embodiment, said cooling steam 146 can comprise said multi-temperature cooling steams 210 and a mixed steam water 212.

In one embodiment, said water 148 can comprise a steam water mixer 202 and said pressurized water streams 206.

a Detailed cycle system 200 can comprise a more detailed version of said hydrogen hybrid cycle system 100.

In one embodiment, said detailed cycle system 200 can comprise said heat recovery steam generator 112, said steam water mixer 202, said feed water cooler 204 and said multi-stage turbines 208. Said heat recovery steam generator 112 in said detailed cycle system 200 can comprise a multi-temperature, elevated pressure configuration.

In one embodiment, said heat recovery steam generator 112 can deliver said multi-temperature cooling steams 210 which can comprise said cooling steam 146 at two or more different temperatures. In one embodiment, said multi-temperature cooling steams 210 can be configured to maximize heat recovery from said turbine exit steam 164. In one embodiment, said turbine exit steam 164 can comprise low-pressure, high-temperature steam.

In one embodiment, said heat recovery steam generator 112 can also produce variable-pressure, variable-temperature steam, if it is required by said combustion chamber 106 to increase performance and flexibility of said hydrogen hybrid cycle system 100 to integrate different tasks. In one embodiment, a plurality of said water pump 118 can be added to said hydrogen hybrid cycle system 100 to regulate different pressures in said multi-temperature cooling steams 210.

In one embodiment, said feed water cooler 204 can be optional. In one embodiment, said feed water cooler 204 can be installed to cool said water 148 before being pumped by said water pump 118 to operate said hydrogen hybrid cycle system 100 at optimum efficiency.

Said water 148 from said water reservoir 116 can enter said feed water cooler 204 using said feed water to feed water cooler input passage 214 and can exit using said feed water to feed water cooler output passage 216. Said feed water to feed water cooler input passage 214 can capture a portion of said water 148 flowing through said second water passage 140. Said feed water to feed water cooler output passage 216 can return a portion of said water 148 back to said second water passage 140 after passing through said feed water cooler 204.

In one embodiment, said feed water cooler 204 can be air-cooled, water-cooled, hydrogen cooled, oxygen cooled, or a combination of different coolants depending on the location, availability of resources and temperature difference of said feed water to feed water cooler input passage 214 and said feed water to feed water cooler output passage 216.

In one embodiment, said H2 142 and said O2 144 enter said combustion chamber 106. A flowrate of said H2 142 and said O2 144 are measured and regulated to attain a stoichiometry or near-stoichiometry ratio. Said H2 142 and said O2 144 can be injected into said combustion chamber 106 and safely ignited. A flame resulting from burning said H2 142 and said O2 144 can result in a steam and an energy released in the form of very high temperature heat.

In one embodiment, cooling said generated steam 152, said hydrogen hybrid cycle system 100 is provided with said pressurized water 150, said multi-temperature cooling steams 210 and said mixed steam water 212 which can be injected into said combustion chamber 106.

In one embodiment, a flame resulting from burning said H2 142 and said O2 144 at stoichiometry or near-stoichiometry ratio can result in a steam and an energy released in the form of very high temperature heat, in order to reduce very high temperature heat generated cooling arrangements are available. Said hydrogen hybrid cycle system 100 cooling system is provided with said pressurized water 150, said multi-temperature cooling steams 210 and said mixed steam water 212 which can be injected into said combustion chamber 106 to generate said generated steam 152.

In one embodiment, a temperature of said generated steam 152 can depend on a flow rate, temperature and pressure of the inputs of said combustion chamber 106 (such as said H2 142, said O2 144, said pressurized water 150, said multi-temperature cooling steams 210 and said mixed steam water 212). said hydrogen hybrid cycle system 100 can comprise a controller and a plurality of sensors for measuring such inputs.

In one embodiment, said combustion chamber 106 can be configured to minimize hot spots in said unburnt gas 162 in said residual steam 154. It can also be designed to handle said multi-temperature cooling steams 210.

In one embodiment, said turbine exit steam 164 can be very hot; wherein, said heat recovery steam generator 112 can harness waste energy and thereby convert said pressurized water 150 into said cooling steam 146 or said multi-temperature cooling steams 210 depending on the configuration.

Said steam water mixer 202 can be used to mix said cooling steam 146, said pressurized water 150 and said multi-temperature cooling steams 210 to increase combustion and mixing efficiency at said combustion chamber 106. Said steam water mixer 202 can be configured to control portions of said cooling steam 146, said pressurized water 150 and said multi-temperature cooling steams 210 to be included in said mixed steam water 212. Said steam water mixer 202 can be configured to optimize temperature, pressure and flow rate of said multi-temperature cooling steams 210 from said heat recovery steam generator 112.

Figure 3:
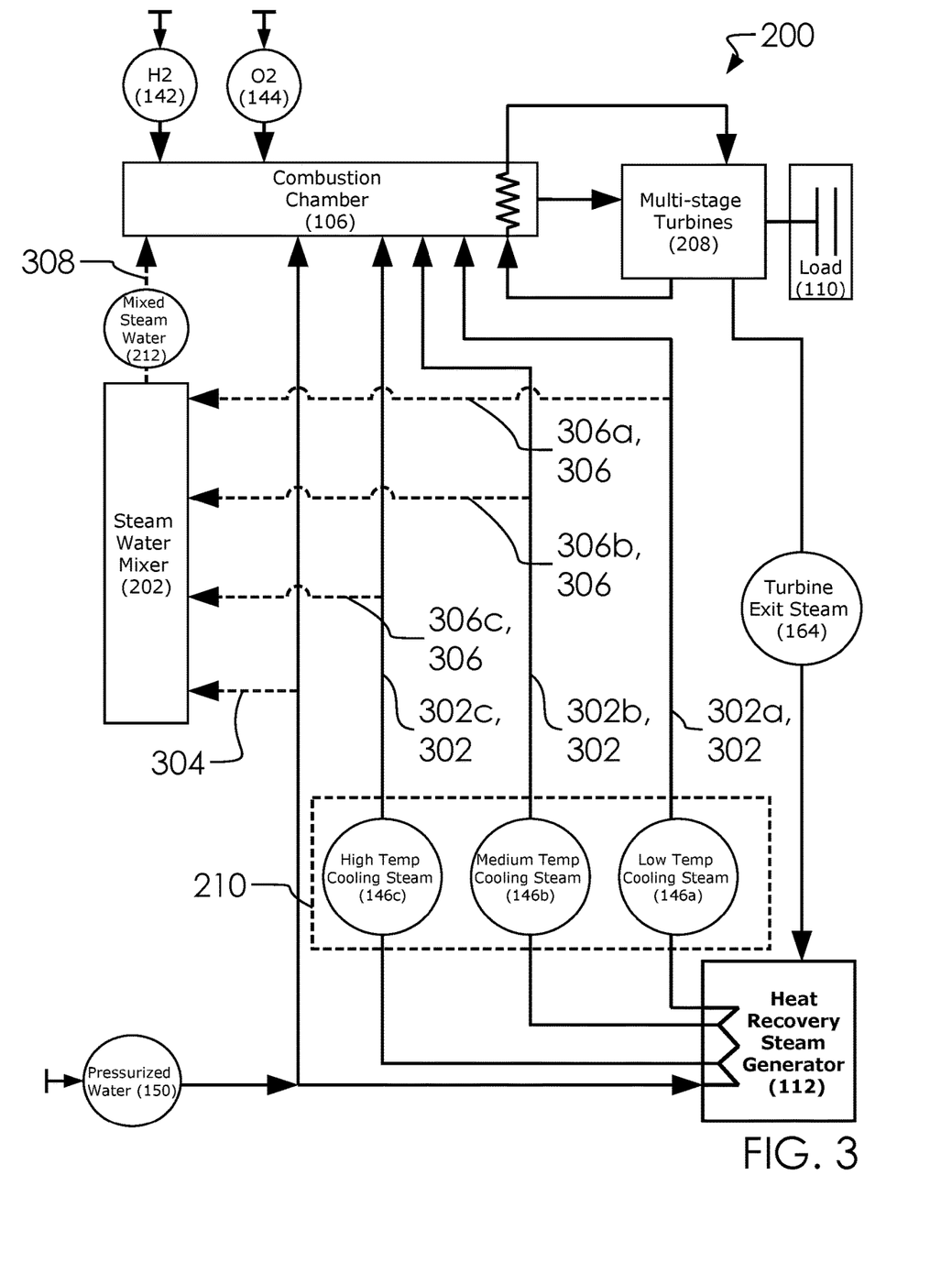
FIG. 3 illustrates block diagram view of a hydrogen hybrid cycle system 100.

FIG. 3 illustrates block diagram view of said hydrogen hybrid cycle system 100.

In one embodiment, one or more cooling steam passages 302 can comprise a first cooling steam passage 302a, a second cooling steam passage 302b and a third cooling steam passage 302c.

In one embodiment, one or more steam to steam water mixer passages 306 can comprise a first steam to steam water mixer passage 306a, a second steam to steam water mixer passage 306b and a third steam to steam water mixer passage 306c.

In one embodiment, said detailed cycle system 200 can comprise a water passage 304, said one or more steam to steam water mixer passages 306 and a mixed steam water passage 308.

In one embodiment, said cooling steam 146 can comprise said one or more cooling steam passages 302.

In one embodiment, said multi-temperature cooling steams 210 can comprise said low temp cooling steam 146a, said medium temp cooling steam 146b and said high temp cooling steam 146c.

In one embodiment, said multi-temperature cooling steams 210 can be passed to said combustion chamber 106 using said one or more cooling steam passages 302; namely, said low temp cooling steam 146a using said first cooling steam passage 302a, said medium temp cooling steam 146b using said second cooling steam passage 302b, and said third cooling steam passage 302c using said high temp cooling steam 146c.

In one embodiment, said low temp cooling steam 146a can comprise a low temperature, said medium temp cooling steam 146b can comprise an intermediate temperature and said high temp cooling steam 146c can comprise a high temperature, as compared with one another.

In one embodiment, said multi-temperature cooling steams 210 can be adjusted, with regard to temperature and flow rate, depending on the optimum design and heat extraction rate of said heat recovery steam generator 112, and can vary according to conditions of said load 110.

In one embodiment, to increase the operational performance of said combustion chamber 106, said multi-temperature cooling steams 210 can be mixed with said pressurized water 150 in said steam water mixer 202 prior to entering said combustion chamber 106. Said first temperature cooling steam 210a can be selectively delivered to said steam water mixer 202 through said one or more steam to steam water mixer passages 306; namely, said low temp cooling steam 146a using said first steam to steam water mixer passage 306a, said medium temp cooling steam 146b using said second steam to steam water mixer passage 306b, and said high temp cooling steam 146c using said third steam to steam water mixer passage 306c. Likewise, a portion of said pressurized water 150 can be delivered to said steam water mixer 202 through said water passage 304.

In one embodiment, said pressurized water 150 can be misted and/or vaporized in said steam water mixer 202 to form said mixed steam water 212. Said mixed steam water 212 can increase a thermal efficiency of a combustion process and reduce hotspots through more uniform mixing of said multi-temperature cooling steams 210 and said pressurized water 150 into said mixed steam water 212 and the combustion product in said combustion chamber 106.

In one embodiment, said steam water mixer 202 can be configured to uniformly mix said cooling steam 146 and said pressurized water 150, and thereby reduce cold spots in said mixed steam water 212 entering said combustion chamber 106. Said mixed steam water 212 can enter said combustion chamber 106 through said mixed steam water passage 308.

In one embodiment, a portion of said multi-temperature cooling steams 210 can pass directly into said combustion chamber 106 through said one or more cooling steam passages 302, and a remaining portion of said multi-temperature cooling steams 210 can pass through said one or more steam to steam water mixer passages 306 into said steam water mixer 202.

In one embodiment, the amount of said pressurized water 150 and said multi-temperature cooling steams 210 entering said steam water mixer 202 depends on the flow rates, temperature and pressure of said pressurized water 150 and said multi-temperature cooling steams 210.

Figure 4:
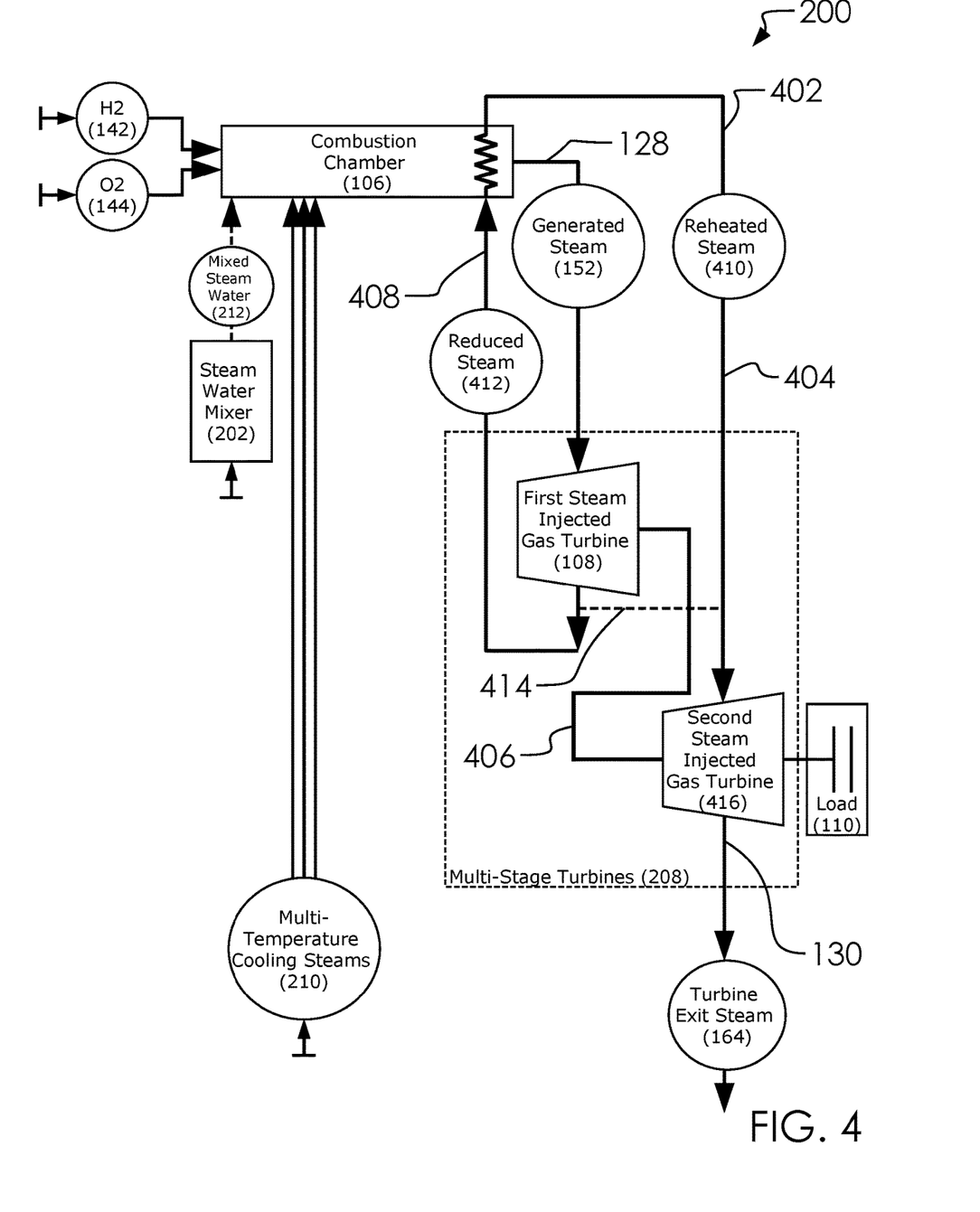
FIG. 4 illustrates block diagram view of a detailed cycle system 200.

In one embodiment, the portions of said pressurized water 150 and said multi-temperature cooling steams 210 entering said combustion chamber 106 and said steam water mixer 202 is optimized depending to various operational parameters in said hydrogen hybrid cycle system 100 to meet requirements of said combustion chamber 106 with regards to safe and efficient operation at maximized cycle performance FIG. 4 illustrates block diagram view of a said detailed cycle system 200.

In one embodiment, said hydrogen hybrid cycle system 100 can comprise a reheated steam 410, a reduced steam 412 and a bypass steam passage 414.

In one embodiment, said multi-stage turbines 208 can comprise said first steam injected gas turbine 108, a passage 402, a reheat steam passage 404, and a reduced steam to combustion chamber passage 408.

In one embodiment, can comprise said multi-stage turbines 208.

Said multi-stage turbines 208 can comprise said first steam injected gas turbine 108 and a second steam injected gas turbine 416.

In one embodiment, said reduced steam 412 can comprise a steam in between stages. Said reduced steam 412 can be bled and reheated in said combustion chamber 106 to said reheated steam 410, and then reinjected into said multi-stage turbines 208, to increase output and efficiency of operation of said hydrogen hybrid cycle system 100.

In one embodiment, said multi-stage turbines 208 can receive said generated steam 152 (which can comprise high-pressure, high-temperature steam) from said combustion chamber 106 through said generated steam passage 128. Said generated steam 152 can then be reduced to a specified pressure and temperature, and re-fed into said combustion chamber 106 through said reduced steam to combustion chamber passage 408 as said reduced steam 412. Said reduced steam 412 can be injected back into said combustion chamber 106 for reheating and become said reheated steam 410 which passes through said passage 402 from said combustion chamber 106. Said reheated steam 410 (intermediate pressure high temperature steam) can be injected into said multi-stage turbines 208 at said second steam injected gas turbine 416 through said reheat steam passage 404. In one embodiment, for operational flexibility in different configurations and loading conditions, said reduced steam 412 can bypass reheating in said combustion chamber 106 be injected directly into said second steam injected gas turbine 416 through said bypass steam passage 414.

In summary, said hydrogen hybrid cycle system 100 can form forms a simple closed loop system with higher operating efficiency and lower capital cost than conventional designs. Said hydrogen hybrid cycle system 100 can have the added benefit of zero operational pollution.

In one embodiment, said hydrogen hybrid cycle system 100 can be useful for power generation, in locomotives for propulsion, and in combined heat and power applications.

In one embodiment, said hydrogen hybrid cycle system 100 can work alongside conventional burners in steam- or gas-turbine power plants to generate power at reduced or zero pollution, provided that the hydrogen is generated from or through renewable energy sources. Said hydrogen hybrid cycle system 100 can also be accommodated in a conventional coal or gas turbine or nuclear power plant with minor changes to generate electricity with reduced pollution and increased efficiency.

In one embodiment, said hydrogen hybrid cycle system 100 can work along with a steam engine, steam- turbine, gas-turbine, or electric hybrid engine. It can completely replace gasoline, diesel, oil or gas engines in trucks, trains, submarines, ships, tanks etc. to increase efficiency at reduced or zero pollution, provided that the hydrogen is generated from or through renewable energy sources.

In one embodiment, said hydrogen hybrid cycle system 100 can be useful for both power generation and heat energy utilization. One such example, but not limited to this, is cane sugar production, in which said hydrogen hybrid cycle system 100 is used to generate electric power. The exhaust steam from the turbine can be used in industrial processing of cane sugar before or after being used in said heat recovery steam generator 112.

Figure 5:
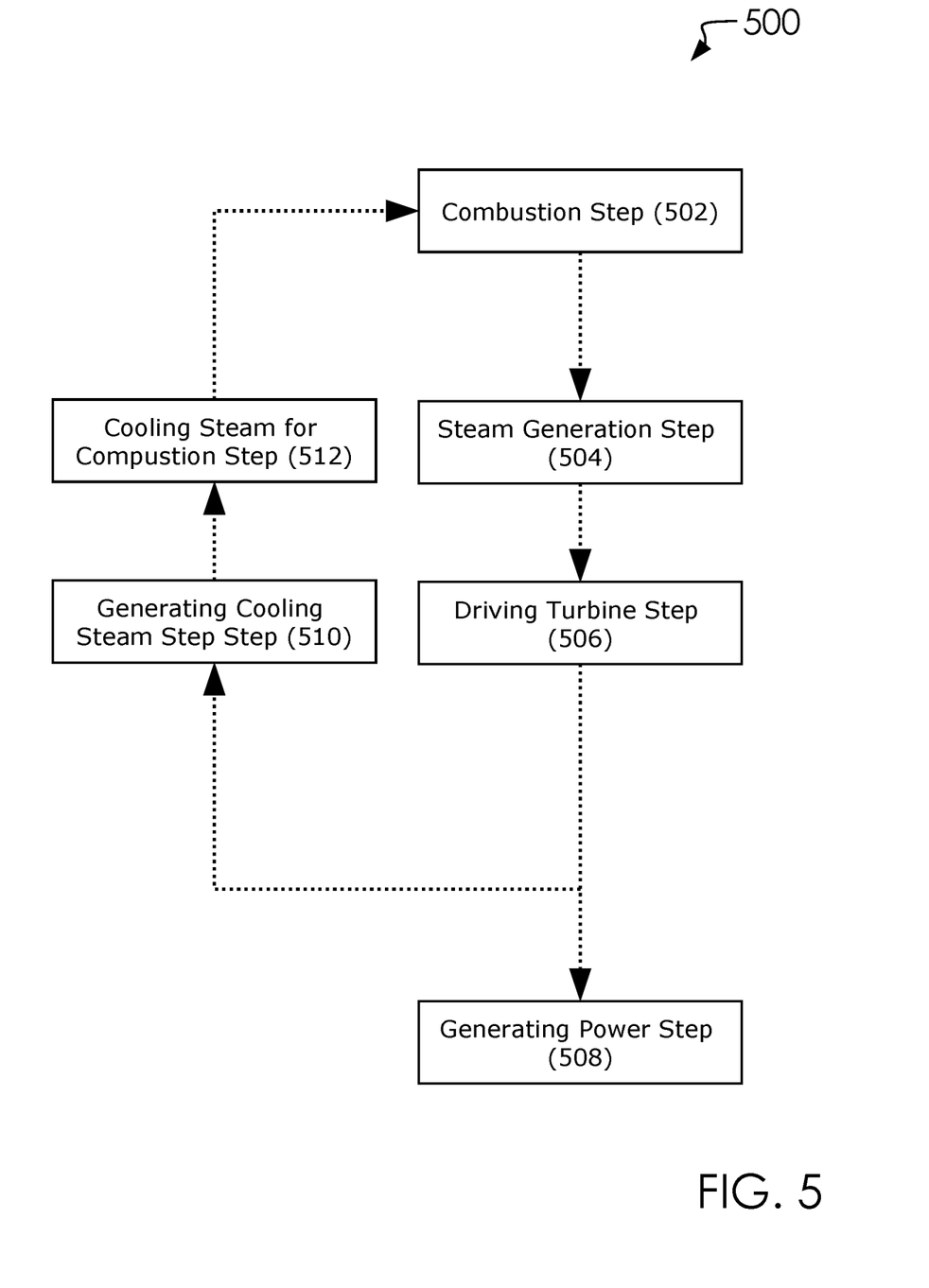
FIG. 5 illustrates a flow chart view of a power generation method 500.

While the invention has been shown in only one of its forms, it is not thus limited but is flexible to various configurations and modifications without departing from the spirit thereof. In one alternative version, said cooling steam 146 by said combustion chamber 106 can be used in various industrial processes before or after being injected into said heat recovery steam generator 112. Possible industrial uses include conventional power plants, sugar production, and paper production FIG. 5 illustrates a flow chart view of a power generation method 500.

In one embodiment, said power generation method 500 can comprise a combustion step 502, a steam generation step 504, a driving turbine step 506, a generating power step 508, a generating cooling steam step 510 and a cooling stream for combustion step 512.

In one embodiment, said power generation method 500 can comprise the steps for implementing said hydrogen hybrid cycle system 100 and said detailed cycle system 200, as discussed above Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein.

Parts List:
said hydrogen hybrid cycle system 100,
Said H2 source 102,
Said O2 source 104,
Said combustion chamber 106,
Said first steam injected gas turbine 108,
Said load 110,
Said heat recovery steam generator 112,
Said deaerator 114,
Said water reservoir 116,
Said water pump 118,
Said steam passage 126,
Said generated steam passage 128,
Said turbine exit steam passage 130,
Said residual steam passage 132,
Said unburnt gas vent passage 134,
Said water reservoir passage 136,
Said bleed water passage 138,
Said second water passage 140,
Said H2 142,
Said O2 144,
Said cooling steam 146,
Said water 148,
Said pressurized water 150,
Said generated steam 152,
Said residual steam 154,
Said hydrogen pump 156,
Said oxygen pump 158,
Said water to heat recovery steam generator passage 160,
Said unburnt gas 162,
Said turbine exit steam 164,
Said low temp cooling steam 146a,
Said medium temp cooling steam 146b,
Said high temp cooling steam 146c,
Said H2 passage 120,
Said O2 passage 122,
Said first water passage 124,
Said pressurized water streams 206,
Said first pressurized water stream 206a,
Said second pressurized water stream 206b,
Said feed water cooler 204,
Said feed water to feed water cooler input passage 214,
Said feed water to feed water cooler output passage 216,
Said multi-temperature cooling steams 210,
Said first temperature cooling steam 210a,
Said second temperature cooling steam 210b,
Said third temperature cooling steam 210c,
Said multi-stage turbines 208,
Said mixed steam water 212,
Said steam water mixer 202,
Said detailed cycle system 200,
Said one or more cooling steam passages 302,
Said first cooling steam passage 302a,
Said second cooling steam passage 302b,
Said third cooling steam passage 302c,
Said one or more steam to steam water mixer passages 306,
Said first steam to steam water mixer passage 306a,
Said second steam to steam water mixer passage 306b,
Said third steam to steam water mixer passage 306c,
Said water passage 304,
Said mixed steam water passage 308,
Said reheated steam 410,
Said reduced steam 412,
Said bypass steam passage 414,
Said passage 402,
Said reheat steam passage 404,
Said reduced steam to combustion chamber passage 408,
Said second steam injected gas turbine 416,
Said power generation method 500,
Said combustion step 502,
Said steam generation step 504,
Said driving turbine step 506,
Said generating power step 508,
Said generating cooling steam step 510, and
said cooling stream for combustion step 512.

Preferred Embodiment:

A hydrogen hybrid cycle system configured to convert heat into mechanical work by burning a H2 and an O2. Said hydrogen hybrid cycle system comprises a H2 source, an O2 source, a combustion chamber, a first steam injected gas turbine, a load, a heat recovery steam generator and a water pump. Said H2 source provides said H2 to said combustion chamber. Said O2 source provides said O2 to said combustion chamber. Said combustion chamber burns portions of said H2 and said O2.Said hydrogen hybrid cycle system burns said H2 and said O2 at or near stoichiometry in said combustion chamber. Said hydrogen hybrid cycle system cools said combustion chamber with at least one of a cooling steam and a water. Said combustion chamber creates a generated steam. Said generated steam turns said first steam injected gas turbine. Said first steam injected gas turbine can be coupled said load.

A hydrogen hybrid cycle system configured to convert heat into mechanical work by burning a H2 and an O2. Said hydrogen hybrid cycle system comprises a H2 source, an O2 source, a combustion chamber, a first steam injected gas turbine, a load, a heat recovery steam generator and a water pump. Said H2 source provides said H2 to said combustion chamber. Said O2 source provides said O2 to said combustion chamber. Said combustion chamber burns portions of said H2 and said O2. Said hydrogen hybrid cycle system burns said H2 and said O2 at or near stoichiometry in said combustion chamber. Said hydrogen hybrid cycle system cools said combustion chamber with at least one of a cooling steam and a water. Said combustion chamber creates a generated steam. Said generated steam turns said first steam injected gas turbine. Said first steam injected gas turbine can be coupled said load.

Said H2 source comprises liquid hydrogen or hydrogen stored in gaseous phase under high pressure or at ambient pressure. Said H2 can be stored in a containment selected among cylinders, geological storage, indirect form, or as a byproduct of industrial process. Said hydrogen hybrid cycle system further comprises a hydrogen pump. Said hydrogen pump can be configured to deliver low pressure H2 as a gaseous phase at the necessary elevated pressure for operation before it enters said combustion chamber. Said hydrogen hybrid cycle system further comprises an hydrogen vaporizer. Said hydrogen pump and said hydrogen vaporizer produce gaseous hydrogen from liquid hydrogen at a necessary pressure for operation before it enters said combustion chamber.

Said H2 comprises an impurity ratio. Said impurity ratio comprises an industrial standard of 99.9% pure hydrogen. Said hydrogen hybrid cycle system can be configured to accommodate said impurity ratio being below said industrial standard depending on a final temperature, a pressure, a quality and a usage of a generated steam by said combustion chamber.

Said O2 source comprises liquid oxygen or oxygen stored in gaseous phase under high pressure or at ambient pressure. Said O2 can be stored in a containment selected among cylinders, geological storage, indirect form, or as a byproduct of industrial process. Said hydrogen hybrid cycle system further comprises an oxygen pump. Said oxygen pump can be configured to deliver low pressure O2 as a gaseous phase at the necessary elevated pressure for operation before it enters said combustion chamber. Said hydrogen hybrid cycle system further comprises an oxygen vaporizer. Said oxygen pump and said oxygen vaporizer produce gaseous oxygen from liquid oxygen at a necessary pressure for operation before it enters said combustion chamber.

Said O2 comprises an impurity ratio. Said impurity ratio comprises an industrial standard of ninety-nine point nine percent pure oxygen. Said impurity ratio comprises an industrial grade. Said hydrogen hybrid cycle system can be configured to accommodate said impurity ratio being below said industrial standard.

A water reservoir stores said water. Said water can be demineralized with chemical additives.

Said hydrogen hybrid cycle system further comprising a feed water cooler. Said feed water cooler comprising a feed water to feed water cooler input passage, and a feed water to feed water cooler output passage. A water reservoir feeds said water to said water pump through a second water passage. Said feed water to feed water cooler input passage pulls a portion of said water out of a second water passage. Said feed water cooler cools a portion of said water. Said feed water to feed water cooler output passage returns a portion of said water back into said second water passage.

Said feed water cooler comprises a cooling equipment selected from among air cooling, and hydrogen cooling. Said feed water cooler can be configured to optimize a temperature of said water to optimize said hydrogen hybrid cycle system.

Said combustion chamber receives: said H2 from said H2 source through a H2 passage, said O2 from said O2 source through an O2 passage, said water from a water reservoir through a second water passage, and said cooling steam from said heat recovery steam generator through a steam passage.

Said combustion chamber can be configured to burn said H2 and said O2 with said pressurized water and said cooling steam.

Said heat recovery steam generator can be configured to generate a multi-temperature cooling steams at multi-temperatures. Said multi-temperature cooling steams can be delivered from said heat recovery steam generator to said combustion chamber through one or more cooling steam passages. Said hydrogen hybrid cycle system further comprises a steam water mixer configured for: receiving a portion of said multi-temperature cooling steams and said pressurized water, mixing said multi-temperature cooling steams and said pressurized water to create a mixed steam water, and delivering said mixed steam water into said combustion chamber through a mixed steam passage.

Said first steam injected gas turbine comprises one among a multi-stage turbines. Said multi-stage turbines comprises said first steam injected gas turbine, a second steam injected gas turbine, and a bypass steam passage. Said multi-stage turbines receives said generated steam from said combustion chamber into said first steam injected gas turbine and generates a reduced steam and powers said load. Said multi-stage turbines receives a reheated steam from said combustion chamber through a passage. Said reheated steam can be fed into said second steam injected gas turbine and can be converted into a turbine exit steam. Said reduced steam can be reheated in said combustion chamber and comes out as said reheated steam. Said reduced steam can be configured to increase a power output of said multi-stage turbines. For operational flexibility in different configurations and loading conditions, said reduced steam can bypass the re-heater in said combustion chamber and be injected directly into said second steam injected gas turbine through said bypass steam passage.

Said multi-stage turbines can be configured to reinject a portion of said reduced steam into said second steam injected gas turbine through said bypass steam passage.

Said heat recovery steam generator receives a turbine exit steam through a turbine exit steam passage. Said turbine exit steam from said multi-stage turbines can be harnessed in said heat recovery steam generator and used to convert said pressurized water into said cooling steam or a multi-temperature cooling steams. Said heat recovery steam generator can be configured to produce a multi-temperature cooling steams. Said multi-temperature cooling steams configured to increase heat recovery rate and cycle efficiency of said hydrogen hybrid cycle system. Said multi-temperature cooling steams comprises a low temp cooling steam, a medium temp cooling steam and a high temp cooling steam, as compared to one another, respectively. A portion of said multi-temperature cooling steams can be delivered to said combustion chamber through said one or more cooling steam passages. A remaining portion of said multi-temperature cooling steams can be delivered to a steam water mixer through one or more steam to steam water mixer passages.

Said heat recovery steam generator receives said pressurized water and a turbine exit steam. Said heat recovery steam generator generates said cooling steam from said pressurized water and heat from said turbine exit steam. Said heat recovery steam generator creates a residual steam from said turbine exit steam. Said turbine exit steam and said pressurized water do not commingle with each other in said heat recovery steam generator.

Said hydrogen hybrid cycle system comprises a deaerator, an unburnt gas vent passage, and a water reservoir passage. Said deaerator receives a residual steam from said heat recovery steam generator through a passage. Said residual steam comprises condensate. An unburnt gas can be released from said deaerator into an atmosphere through said unburnt gas vent passage. Said deaerator delivers a portion of said water to a water reservoir through said water reservoir passage.

Said hydrogen hybrid cycle system comprises said water pump, a first water passage, a second water passage and a water to heat recovery steam generator passage. Said water can be pumped out of a water reservoir through said second water passage and into said water pump. Said water can be converted into a pressurized water in said water pump. Said heat recovery steam generator produces a multi-temperature cooling steams. Said water pump comprises a plurality of pumps configured to pump said water into said heat recovery steam generator at a desired pressure.

A steam water mixer receives said pressurized water from said water pump through a third water passage and a multi-temperature cooling steams from said heat recovery steam generator through one or more steam to mixer passages. Said multi-temperature cooling steams and said pressurized water can be mixed together by said steam water mixer into said mixed steam water. Said steam water mixer mists a portion of said pressurized water. Said steam water mixer vaporizes a portion of said pressurized water. Said mixed steam water can be delivered into said combustion chamber through said mixed steam passage. A portion of said water to heat recovery steam generator passage and said multi-temperature cooling steams entering said combustion chamber and said steam water mixer can be optimized to operate said hydrogen hybrid cycle system at maximized cycle performance. A portion of said water to heat recovery steam generator passage and said multi-temperature cooling steams entering said combustion chamber and said steam water mixer can be optimized depending on safe and efficient operation of said hydrogen hybrid cycle system. A portion of said water to heat recovery steam generator passage and said multi-temperature cooling steams entering said combustion chamber and said steam water mixer can be optimized depending on operational parameters in said hydrogen hybrid cycle system.

Said load can be selected from among an AC generator, a DC generator, a transmission drive, one or more pumps, one or more compressors, a locomotive, and one or more mechanical rotational loads.

The invention claimed is:

1. A hydrogen hybrid cycle system configured to convert heat into mechanical work by burning a H2 and an O2, wherein:
    said hydrogen hybrid cycle system comprises a H2 source, an O2 source, a combustion chamber, a first steam injected gas turbine, a load, a heat recovery steam generator, a water reservoir having a water, and a water pump;
    said H2 source provides said H2 to said combustion chamber;
    said O2 source provides said O2 to said combustion chamber;
    said combustion chamber burns portions of said H2 and said O2;
    said hydrogen hybrid cycle system burns said H2 and said O2 at or near stoichiometry in said combustion chamber;
    said hydrogen hybrid cycle system cools said combustion chamber with at least one of a cooling steam and a water;
    said combustion chamber creates a generated steam;
    said water pump is configured for
        pulling said water from said water reservoir,
        pressurizing said water into a pressurized water,
        pumping a portion of said pressurized water to said heat recovery steam generator, and
        pumping a remaining portion of said pressurized water to said combustion chamber as a cooling water;
    said generated steam turns said first steam injected gas turbine; and
    said first steam injected gas turbine is coupled with said load.

2. The hydrogen hybrid cycle system from claim 1, wherein:
    said H2 source is configured to store and provide said H2 in a selectable form, either as a liquid hydrogen or a gaseous hydrogen;
    said hydrogen hybrid cycle system comprises a hydrogen phase management system configured to maintain said H2 in said gaseous phase when stored and to convert said liquid hydrogen to said gaseous hydrogen before delivery to said combustion chamber; and
    said hydrogen phase management system includes a hydrogen pump for delivering said gaseous hydrogen at a necessary elevated pressure for operation, and a hydrogen vaporizer for converting said liquid hydrogen to gaseous hydrogen at a necessary pressure for operation.

3. The hydrogen hybrid cycle system from claim 1, wherein:
    said H2 comprises an impurity ratio;
    said impurity ratio comprises an industrial standard of 99.9% pure hydrogen; and
    said hydrogen hybrid cycle system is configured to accommodate said impurity ratio being below said industrial standard depending on a final temperature, a pressure, a quality and a usage of a generated steam by said combustion chamber.

4. The hydrogen hybrid cycle system from claim 1, wherein:
    said O2 source is configured to store and provide O2 in a selectable form, either as a liquid oxygen or a gaseous oxygen;
    said hydrogen hybrid cycle system comprises an oxygen phase management system configured to maintain said O2 in said gaseous oxygen form when stored and to convert said liquid oxygen to gaseous oxygen before delivery to said combustion chamber;
    said oxygen phase management system includes an oxygen pump for delivering said gaseous oxygen at a necessary elevated pressure for operation, and an oxygen vaporizer for converting said liquid oxygen to gaseous oxygen at a necessary pressure for operation.

5. The hydrogen hybrid cycle system from claim 1, wherein:
    said O2 comprises an impurity ratio;
    said impurity ratio comprises an industrial standard of ninety-nine point nine percent pure oxygen;
    said impurity ratio comprises an industrial grade; and
    said hydrogen hybrid cycle system is configured to accommodate said impurity ratio being below said industrial standard.

6. The hydrogen hybrid cycle system from claim 1, wherein:
    said water reservoir of said hydrogen hybrid cycle system is configured to store water for operational use within the system; and
    said water reservoir stores said water which is demineralized with chemical additives to optimize its suitability for system operations.

7. The hydrogen hybrid cycle system from claim 1, wherein:
    said hydrogen hybrid cycle system further comprising a feed water cooler;
    said feed water cooler comprising a feed water to feed water cooler input passage, and a feed water to feed water cooler output passage;
    a water reservoir feeds said water to said water pump through a feed water passage;
    said feed water to feed water cooler input passage pulls a portion of said water out of said feed water passage;
    said feed water cooler cools said portion of said water; and said feed water to feed water cooler output passage returns a portion of said water back into said feed water passage.

8. The hydrogen hybrid cycle system from claim 7, wherein:
   said feed water cooler comprises a cooling equipment selected from among air cooling, and hydrogen cooling; and
   said feed water cooler is configured to optimize a temperature of said water to optimize said hydrogen hybrid cycle system.

9. The hydrogen hybrid cycle system from claim 1, wherein:
   said combustion chamber receives:
      said H2 from said H2 source through a H2 passage,
      said O2 from said O2 source through an O2 passage,
      said water from a water reservoir through a feed water passage, and
      said cooling steam from said heat recovery steam generator through a steam passage.

10. The hydrogen hybrid cycle system from claim 1, wherein:
    said heat recovery steam generator is configured to generate a multi-temperature cooling steams at multi-temperatures;
    said multi-temperature cooling steams are delivered from said heat recovery steam generator to said combustion chamber through a portion of one or more cooling steam passages, carrying steam at various temperature at the same time to different sections of combustion chamber to be used as a cooling steam;
    said hydrogen hybrid cycle system further comprises a steam water mixer configured for:
       receiving a portion of said multi-temperature cooling steams and said pressurized water,
       mixing said multi-temperature cooling steams and said pressurized water to create a mixed steam water, and
       delivering said mixed steam water into said combustion chamber through a mixed steam passage.

11. The hydrogen hybrid cycle system from claim 10, wherein:
    said combustion chamber is configured to burn said H2 and said O2 with said pressurized water and said cooling steam.

12. The hydrogen hybrid cycle system from claim 1, wherein:
    said first steam injected gas turbine comprises one among a multi-stage turbines;
    said multi-stage turbines comprises said first steam injected gas turbine, a second steam injected gas turbine, and a bypass steam passage;
    said multi-stage turbines receives said generated steam from said combustion chamber into said first steam injected gas turbine and generates a reduced steam and powers said load;
    said multi-stage turbines receives a reheated steam from said combustion chamber through a passage;
    said reheated steam is fed into said second steam injected gas turbine and is converted into a turbine exit steam;
    said reduced steam is reheated in said combustion chamber and comes out as said reheated steam;
    said reduced steam is configured to increase a power output of said multi-stage turbines; and
    for operational flexibility in different configurations and loading conditions, said reduced steam can bypass the re-heater in said combustion chamber and be injected directly into said second steam injected gas turbine through said bypass steam passage.

13. The hydrogen hybrid cycle system from claim 12, wherein:
    said multi-stage turbines are configured to reinject a portion of said reduced steam into said second steam injected gas turbine through said bypass steam passage.

14. The hydrogen hybrid cycle system from claim 1, wherein:
    said heat recovery steam generator receives a turbine exit steam through a turbine exit steam passage;
    said turbine exit steam from said first steam injected gas turbine is harnessed in said heat recovery steam generator and used to convert said pressurized water into a multi-temperature cooling steams;
    said heat recovery steam generator is configured to produce a multi-temperature cooling steams;
    said multi-temperature cooling steams configured to increase heat recovery rate and cycle efficiency of said hydrogen hybrid cycle system;
    said multi-temperature cooling steams comprises a low temp cooling steam, a medium temp cooling steam and a high temp cooling steam, as compared to one another, respectively;
    a portion of said multi-temperature cooling steams are delivered to said combustion chamber through a portion of one or more cooling steam passages; and
    a remaining portion of said multi-temperature cooling steams is delivered to a steam water mixer through one or more steam to steam water mixer passages.

15. The hydrogen hybrid cycle system from claim 1, wherein:
    said heat recovery steam generator receives said pressurized water and a turbine exit steam;
    said heat recovery steam generator generates said cooling steam from said pressurized water and heat from said turbine exit steam;
    said heat recovery steam generator creates a residual steam from said turbine exit steam; and
    said turbine exit steam and said pressurized water do not commingle with each other in said heat recovery steam generator.

16. The hydrogen hybrid cycle system from claim 1, wherein:
    said hydrogen hybrid cycle system comprises a deaerator, an unburnt gas vent passage, and a water reservoir passage;
    said deaerator receives a residual steam from said heat recovery steam generator through a passage;
    said residual steam comprises condensate;
    an unburnt gas is released from said deaerator into an atmosphere through said unburnt gas vent passage; and
    said deaerator delivers a portion of said water to a water reservoir through said water reservoir passage.

17. The hydrogen hybrid cycle system from claim 1, wherein:
    said hydrogen hybrid cycle system comprises said water pump, a first water passage, a feed water passage and a water to heat recovery steam generator passage;
    said water is pumped out of a water reservoir through said feed water passage and into said water pump;
    said water is converted into a pressurized water in said water pump;
    said heat recovery steam generator produces a multi-temperature cooling steams; and said water pump comprises a plurality of pumps configured to pump said water into said heat recovery steam generator at a desired pressure.

18. The hydrogen hybrid cycle system from claim 1, wherein:
   a steam water mixer receives said pressurized water from said water pump through a pressurized water passage and a multi-temperature cooling steams from said heat recovery steam generator through one or more steam to mixer passages;
   said multi-temperature cooling steams and said pressurized water are mixed together by said steam water mixer into a mixed steam water;
   said steam water mixer mists a portion of said pressurized water;
   said steam water mixer vaporizes a portion of said pressurized water;
   said mixed steam water is delivered into said combustion chamber through said mixed steam passage;
   a portion of said water to heat recovery steam generator passage and said multi-temperature cooling steams entering said combustion chamber and said steam water mixer are optimized to operate said hydrogen hybrid cycle system at maximized cycle performance;
   a portion of said water to heat recovery steam generator passage and said multi-temperature cooling steams entering said combustion chamber and said steam water mixer are optimized for safe and efficient operation of said hydrogen hybrid cycle system; and
   a portion of said water to heat recovery steam generator passage and said multi-temperature cooling steams entering said combustion chamber and said steam water mixer are optimized for operational parameters in said hydrogen hybrid cycle system.

19. The hydrogen hybrid cycle system from claim 1, wherein:
   said load is selected from among an AC generator, a DC generator, a transmission drive, one or more pumps, one or more compressors, a locomotive, and one or more mechanical rotational loads.

* * * * *